United States Patent [19]

Torii et al.

[11] Patent Number: 5,323,102

[45] Date of Patent: Jun. 21, 1994

[54] POWER SOURCE UNIT FOR AN AUTOMOTIVE VEHICLE

[75] Inventors: Koshi Torii, Iwakura; Yoshihiro Itoh, Kariya, both of Japan

[73] Assignee: Nippondenso Co., Ltd., Kariya, Japan

[21] Appl. No.: 79,851

[22] Filed: Jun. 22, 1993

Related U.S. Application Data

[63] Continuation of Ser. No. 719,702, Jun. 27, 1991, abandoned.

[30] Foreign Application Priority Data

Jun. 28, 1990 [JP] Japan .................................. 2-171097
Mar. 15, 1991 [JP] Japan .................................. 3-051476

[51] Int. Cl.$^5$ .................................................. H02P 9/00
[52] U.S. Cl. ...................................................... 322/90
[58] Field of Search ................... 322/90, 89, 6; 320/6, 320/15, 56, 59, DIG. 2

[56] References Cited

U.S. PATENT DOCUMENTS

| | | | |
|---|---|---|---|
| 3,654,538 | 4/1972 | Gardberg | 220/15 X |
| 4,491,779 | 1/1985 | Campbell et al. | 320/6 |
| 4,720,645 | 1/1988 | Stroud | 320/15 X |
| 4,999,563 | 3/1991 | Suzuki | 322/90 |

FOREIGN PATENT DOCUMENTS

| | | |
|---|---|---|
| 3812577 | 12/1989 | Fed. Rep. of Germany . |
| 48-31364 | 9/1973 | Japan . |
| 48-73733 | 10/1973 | Japan . |
| 49-95158 | 9/1974 | Japan . |
| 51-130833 | 11/1976 | Japan . |
| 60-102825 | 6/1985 | Japan . |
| 1-234023 | 9/1989 | Japan . |
| 1-308133 | 12/1989 | Japan . |

*Primary Examiner*—Steven L. Stephan
*Assistant Examiner*—E. To
*Attorney, Agent, or Firm*—Cushman, Darby & Cushman

[57] ABSTRACT

A power source unit for an automotive vehicle comprises an alternator, a rectification unit for converting an alternating current output of the alternator to a direct current, and outputting same through first and second output sections, a first power accumulation unit connected in parallel with a first load, for receiving a power supply through the first output section, a second power accumulation unit connected in parallel with a second load, for receiving a power supply through the second output section, an alternator output control unit for adjusting an output of the alternator depending upon a terminal voltage of the first power accumulating unit, to maintain the terminal voltage of the first power accumulating unit at a predetermined level, and a voltage control unit responsive to a drop in a terminal voltage of the second power accumulation unit to predetermined level, to permit a power supply to the second power accumulation unit through the rectification unit to thus maintain the terminal voltage of the second power accumulation unit at a predetermined level.

18 Claims, 6 Drawing Sheets

5,323,102

POWER SOURCE UNIT FOR AN AUTOMOTIVE VEHICLE

This is a continuation of application Ser. No. 07/719,702 filed on Jun. 27, 1991 which was abandoned upon the filing hereof.

BACKGROUND OF THE INVENTION

1. Field of the Invention

The present invention relates to a power source unit for an automotive vehicle, which is capable of parallel supply of mutually distinct supply voltages of power to a plurality of loads. More specifically, the invention relates to a power source unit for an automotive vehicle, which rectifies a power source voltage supplied from an alternator and drives a plurality of mutually distinct kinds of loads including a stator motor, independently of each other.

2. Description of the Related Arts

Japanese Unexamined Patent Publication (Kokai) 1-308133 discloses a power source unit for an automotive vehicle which employs a plurality of power generators for a parallel supply of power source voltages for a plurality of mutually distinct vehicular loads.

However, since spaces within engine rooms of automotive vehicles are strictly limited and the generators are generally driven by an output torque of engines via belts, orientations for installing the generators are quite limited, and therefore, only a few types of vehicles, which can provide sufficient space in the engine rooms, can employ a plurality of generators.

In general, the conventional power source unit of the automotive vehicle generates a source voltage by means of a three-phase alternator, and rectifies the source voltage by means of a three-phase full-wave rectifier for charging a single battery. The battery voltage is used for driving a start-up load system, such as a starter motor, and other non-start up load systems, in parallel.

On the other hand, Japanese Unexamined Patent Publication (Kokai) 60-102825 discloses a two voltage outputs type power source unit for an automotive vehicle, in which two batteries are connected in series, connected to both ends of a three-phase full-wave rectifier. In addition, a junction between two batteries and a neutral point of the three-phase full-wave rectifier is connected via a three-phase silicon controller rectifier bridge.

However, the electric load for an automotive vehicle is growing due to an installation of car telephone and so forth, and the above-mentioned type of power source unit, which has a pair of three-phase alternators and a single battery and will be hereafter referred to as "single battery type power source unit", may be subject to a problem of a drawing of a battery during an inoperative state of the engine, due to a large power consumption. Such a weak battery can affect the start-up characteristics of the engine.

Of course, such a problem may be resolved by providing a vehicular power source unit which has a pair of three-phase alternators and a battery for a load which is associated with a vehicular engine driving system including a starter or starter motor, which load will be hereafter referred to as "engine drive associated load", and another vehicular power source unit which also has another pair of three-phase alternators and a battery for a load which is irrelevant to the engine driving, and thus will be hereafter referred to as "non-engine drive associated load". However, such arrangement becomes too bulky.

In addition, where one of the outputs of the two voltage outputs type vehicular power source unit is connected to the engine start-up system, all loads utilizing the same voltage level to the engine start-up system must be connected to the engine start-up system channel. Therefore, a load on the battery for an engine drive associated load cannot be effectively reduced. Furthermore, in order to charge batteries connected in series, the three-phase alternator to be employed in the vehicular power source unit must be designed for a high voltage.

SUMMARY OF THE INVENTION

With the above-mentioned problems in mind, an object of the present invention is to provide a power source unit for an automotive vehicle, which is capable of a parallel supply of mutually distinct supply voltages for a plurality of load and exhibits an easy installation ability and economical cost.

To achieve the aforementioned and other objects, a power source unit for an automotive vehicle, according to the present invention, comprises;

a power generator driven by an engine;

a rectification means which converts an alternating current output of the power generator to a direct current output, and outputs the direct current output through first and second output sections;

a first power accumulation means connected in parallel with a first load receiving power supply through the first output section;

a second power accumulation means connected in parallel with a second load receiving power supply through the second output section;

an alternator output control means which adjusts an output of the power generator depending upon a terminal voltage of the first power accumulating means, to maintain the terminal voltage of the first power accumulating means, which receives a power supply through the first output section of the rectification means, at a predetermined level; and a voltage control means responsive to drop of a terminal voltage of the second power accumulation means to a predetermined level, to permit a power supply to the second power accumulation means through the second output section of the rectification means to thus maintain the terminal voltage of the second power accumulation means at a predetermined level.

Namely, the power source unit for the automotive vehicle, according to the present invention, has a plurality of rectifiers, and a plurality of kinds of loads connected to the respective rectifier means, for independently controlling a voltage to be supplied for respective loads. The means for controlling a supply voltage comprises the alternator output control means and the voltage control means, and optionally, a boosting transformer means. Accordingly, a plurality of mutually distinct kinds of load can be driven independently and in parallel.

BRIEF DESCRIPTION OF THE DRAWINGS

The present invention will be more fully understood from the detailed discussion given herebelow and from the accompanying drawings of the preferred embodiments of the present invention, which, however, should not be taken to limit the invention, but are for elucidation and understanding only.

In the drawings.

DESCRIPTION OF THE PREFERRED EMBODIMENTS

Preferred embodiments of a power source unit for an automotive vehicle, according to the present invention, will be discussed hereafter with reference to the accompanying drawings.

Figure 1:
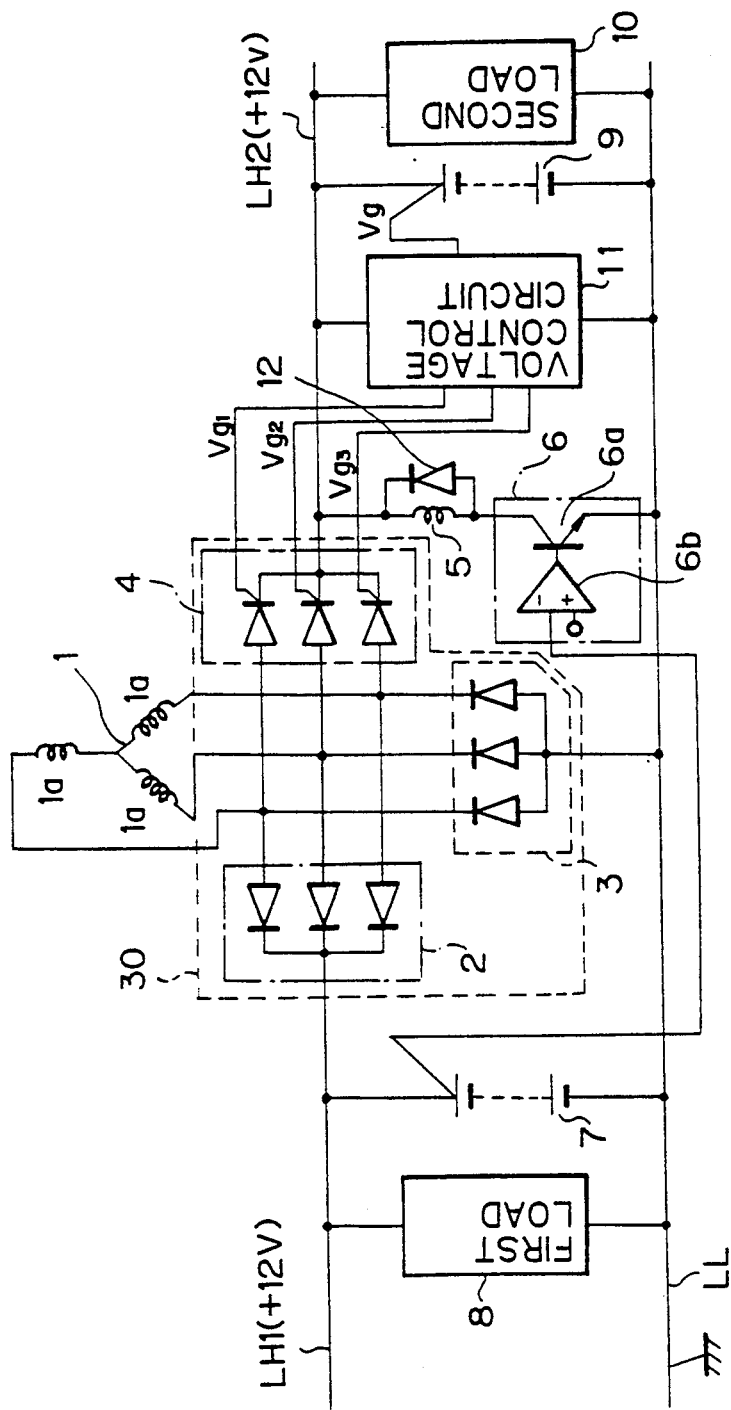
FIG. 1 is a circuit diagram of one embodiment of a power source unit for an automotive vehicle according to the present invention.

FIG. 1 shows one practical embodiment of a vehicular power source unit, according to the invention, as a block diagram. The vehicular power source unit comprises an alternator 1 as a power generator, which is driven by an engine, a rectification means 30 which converts an alternating current output of the alternator 1 to a direct current output, and outputs the direct current output through first and second output sections, a first power accumulation means 7 connected in parallel with a first load 8 receiving power supply through the first output section $LH_1$, a second power accumulation means 9 connected in parallel with a second load 10 receiving power supply through the second output section $LH_2$, an alternator output control means 6 which adjusts output of the alternator depending upon terminal voltage of the first power accumulating means 7 to maintain the terminal voltage of the first power accumulating means 7 which receives power supply through the first output section $LH_1$ of the rectification means 30, at a predetermined level, and a voltage control means 11 responsive to a drop in a terminal voltage of the second power accumulation means 9 to predetermined level, to permit a power supply to the second power accumulation means 9 through the second output section $LH_2$ of the rectification means 30 to thus maintain the terminal voltage of the second power accumulation means 9 at a predetermined level.

A practical embodiment of the rectification means 30 according to the invention will be discussed with reference to FIG. 1. The rectification means 30 preferably comprises a higher level diode bridge 2 having anodes respectively connected to respective output terminals of the alternator 1 independently of each other and supplying a first power source voltage to the first load 8 and the first power accumulation means 7, a switching bridge 4 having anodes respectively connected to respective output terminals of the alternator 1 independently of each other and supplying a second power source voltage to the second load 10 and the second power accumulation means 9, and a lower level diode bridge 3 having cathodes respectively connected to respective of the output terminals of the alternator 1 independently of the other and anodes commonly connected to the lower level side of the first and second loads 8 and 10.

In the shown embodiment, the lower level diode bridge 3 forms two voltage outputs type rectifier together with the higher level diode bridge 2 and the switching bridge 4. The first power source voltage and the second power source voltage can be at the same level or at different levels. As the first and second power accumulation means 7 and 9, batteries or capacitors can be employed. The alternator output control means 6 detects the first power source voltage for controlling power generation in the alternator 1 based thereon. The voltage control means 11 detect the second power source voltage of the rectifier and controls conduction of the switching bridge 4. Accordingly, the first power source voltage can be maintained at a rated voltage by controlling power generation of the alternator 1. Also, the second power source voltage is maintained at a rated voltage by controlling a conduction of the switching bridge 4.

As discussed above, the practical embodiment of the vehicular power source unit is provided with the alternator output control means 6 for controlling a power generation of the alternator 1 by detecting the first power source voltage, and the voltage control means 11 for controlling the switching bridge 4 between conductive state and non-conductive state by detecting the second power source voltage. The shown embodiment of the power source unit successfully and advantageously establishes a parallel and mutually independent drive of two different kinds of loads with a single alternator, and has a simply constructed circuit.

In addition, in the shown embodiment, the first load 8 which receives the first power source voltage from the higher level diode bridge 2, is a non-engine drive associated load, such as a fan motor, a head lamp or so forth, regardless of engine driving. In the practical embodiment, the first power accumulation means 7 comprises the battery which is employed for driving a non-engine drive associated load. Preferably, the rated voltages of the first and second loads 8 and 10 are set at 12 V. On the other hand, the second load 10, which receives power supply from the switching bridge 4, is an engine drive associated load, such as the starter motor, spark ignition system or so forth. The second power accumulation means 9 comprises a battery for driving the engine drive associated load.

Furthermore, the switching bridge 4 in the shown embodiment preferably comprises a silicon controlled rectifier bridge. As discussed above, the invention employs the construction comprising the battery 9 for the engine drive associated load 10, which battery 9 is connected in parallel with the engine drive associated 10 to receive a power supply from the silicon controlled rectifier bridge 4, and the battery 7 for non-engine drive associated load connected in parallel with the non-engine drive associated load 8 to receive a power supply from the higher level diode bridge 4. Further preferably, the shown embodiment of the power source unit employs the alternator output control means 6 which performs feedback control of field current of the alternator 1, such as three-phase alternator, depending upon variation of the electric potential at the terminal of the battery 7 for the non-start up load, and a voltage control means 11 which serves as rectifier switching means for suppressing fluctuation of an electric potential at the terminal of battery 9 for a start-up load by opening and closing the silicon controlled rectifier bridge 4 depending upon a variation of potential at the terminal of the battery 9 for the engine drive associated load.

In the construction of FIG. 1, each output end of stator coils 1a of the three-phase alternator 1, which is driven by the automotive engine, is connected to respective anodes of the higher level diode bridge 2 and the switching bridge 4, and cathode of the lower level diode bridge 3, forming the rectification means 30. The higher level diode bridge 2 and the lower level diode bridge 3 comprise a silicon diode. On the other hand, the switching bridge 4 comprises a thyristor (SCR).

In practice, the common cathode of the higher level diode bridge 2 is connected to the power supply line $LH_1$. The common cathode of the switching bridge 4 is connected to the power supply line $LH_2$. The common anode of the lower level diode bridge 3 is connected to a grounding line LL. Between the power supply line $LH_1$ and the grounding line LL, load, regardless of starting up of the engine, such as head lamp and thus referred to as a non-engine drive associated load 8, and the battery 7 are connected in parallel to each other. Between the power supply line $LH_2$ and the grounding line LL, the load related to a starting up of the engine, such as a starter motor, ignition system and so forth and thus referred to as the engine drive associated load 10, and the battery 9 are connected in parallel to each other.

Furthermore, between the power supply line $LH_2$ and the grounding line LL, an electromagnetic coil 5 of the three-phase alternator 1 and the alternator output control means 6 are connected in series. To both ends of the electromagnetic coil 5, a protection diode (flywheel diode) 12 is connected in parallel.

The construction and operation of the alternator output control means 6 is widely known and thus a detailed discussion thereof is omitted. In the basic construction, the alternator output control means 6 may comprise a comparator 6b which compares the potential at the terminal of the battery 7 with a constant reference potential to output high voltage when the terminal potential is lower than the reference potential, an emitter grounding type transistor 6a which is switched between conductive state and non-conductive state by the comparator 6b to establish and block supply of exciting current for the electromagnetic coil 5. Such as alternator output control means 6 performs feedback control of the exciting current for the electromagnetic coil 5 with taking the terminal potential of the battery 7 as control parameter, and thus maintains the terminal potential of the battery 7 constant.

Respective cathodes of the switching bridge 4 are positive terminal of the battery 9 via the second power supply line $LH_2$. The negative terminal of the battery 9 is grounded. The second load 10 is connected in parallel with the battery 9. The voltage control circuit 11 receives power supply from the battery 9, and has output terminal supplies gate voltage for each SCR of the switching bridge 4.

Figure 2:
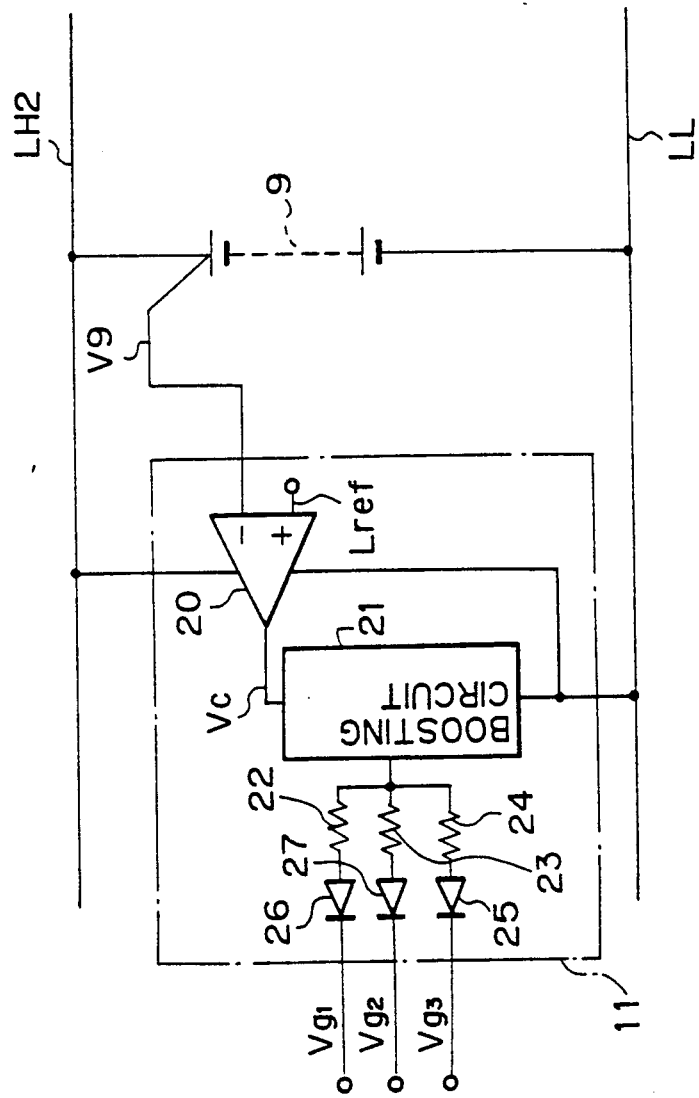
FIG. 2 is a circuit diagram of one embodiment of a voltage control means.

The voltage control circuit 11 employed in the present invention will be discussed in detail with reference to FIG. 2.

The voltage control circuit 11 has a comparator 20 which compares the terminal voltage $V_9$ of the battery 9 with a constant reference voltage $V_{ref}$ to output predetermined HIGH level output voltage Vc when the terminal voltage $V_9$ is lower than the reference voltage $V_{ref}$, and to output predetermined LOW level output voltage Vc when the terminal voltage $V_9$ is higher than or equal to the reference voltage $V_{ref}$, a boosting circuit 21 which boosts output voltage Vc of the comparator 20 to produce a gate trigger voltage Vg ($V_{g1}$ to $V_{g3}$) to be applied to the gate of SCR bridge 4. The boosting circuit 21 may comprise DC-DC converter which outputs the gate trigger voltage Vg which has higher voltage level than the HIGH level output voltage Vc of the comparator 20, in a predetermined magnitude. For electrical separation and limiting electric current between gates of a SCR bridge 4, series circuits of the resistors 22 to 24 and diodes 25 to 27 are provided between each gate and the boosting circuit 21. Accordingly, the voltage control circuit 11 sets the gate trigger voltage Vg at HIGH level when the terminal voltage $V_9$ of the battery 9 is lower than the reference voltage $V_{ref}$ to turn OFF each SCR, and set the gate trigger voltage Vg at LOW level when the terminal voltage $V_9$ is higher than or equal to the reference voltage $V_{ref}$ to turn ON each SCR. Therefore, the voltage control circuit 11 performs a feedback control taking the terminal potential $V_9$ as control parameter to maintain the terminal potential at constant level. Each of the reference voltages are supplied from voltage regulator circuit (rated output 12 V).

Figure 3:
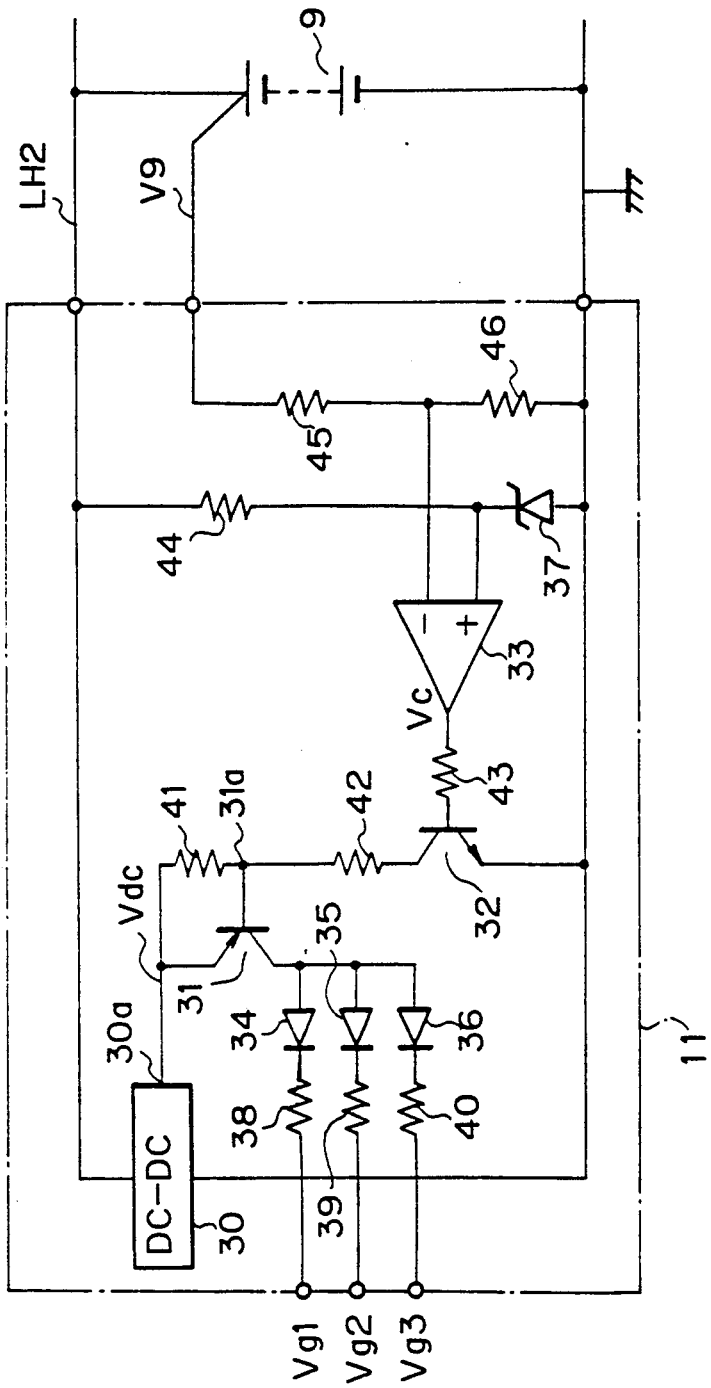
FIG. 3 is a circuit diagram of another embodiment of a voltage control means to be employed in the present invention.

FIG. 3 shows another embodiment of the voltage control means 11 to be employed in the present invention. In the drawing, the reference numeral 104 denotes a known DC-DC converter which boosts the second power source voltage of the second power supply line $LH_2$ to output from the output terminal 30a. The reference numeral 31 and 32 denotes a transistors, 33 denote comparator, 34, 35 and 36 denote diodes, 37 denotes a constant voltage diode, 38, 39, 40, 41, 42, 43, 44, 45 and 46 denote resistors.

A divided voltage of the output voltage $V_9$ of the battery 9, which is divided by the resistors 45 and 46, and the reference voltage output from the junction between the resistor 44 and the constant voltage diode 37 are compared by the comparator 33. When the voltage $V_9$ of the battery 9 is lower than the predetermined level, the output of the comparator 33 becomes "1" (HIGH level) to turn on the emitter grounding NPN type transistor 32 via the resistor 43. To the collector of the NPN type transistor 32, the direct current $V_{dc}$ boosted by the DC-DC converter 104 via the resistors 42 and 41 flows.

A junction 31a is connected to the base of a PNP transistor 31. The emitter of the PNP transistor 31 is connected to output terminal of DC-DC converter. Accordingly, in response to turning ON the transistor 32, the potential at the junction 31a is lowered. Then, the transistor 31 turns ON. By this, the gate trigger voltage $V_{g1}$ supplied from the collector of the PNP transistor 31 via the diode 34 and the resistor 38 to one of SCR of the switching bridge 4, becomes HIGH level. Similarly, the gate trigger voltages $V_{g2}$ and $V_{g3}$ supplied to remaining two SCR of the switching bridge 4 respectively via the diode 35 and the resistor 39 and via the diode 36 and the resistor 40. Then, the switching bridge 4 becomes conductive so that the highest voltage level of phase voltage of the alternator 1 is supplied to the second power supply line $LH_2$ when a highest phase voltage of the alternator 1 is higher than the second power source voltage.

Contrary to this, when the voltage of the battery 9 becomes higher than the predetermined value, the output of the comparator 33 become "0" (LOW level). Then, in the reversed process, the transistors 32 and 31 turn OFF. Since the SCR of the switching bridge 4 are connected to the alternating current output terminal of the alternator 1, the gate trigger voltages $V_{g1}$, $V_{g2}$ and $V_{g3}$ become LOW level. Then, the reverse voltage arises between the anode and cathode to turn SCR OFF. Then, the SCR is maintained OFF until the next occurrence of a HIGH level gate trigger voltage $V_{g1}$, $V_{g2}$ and $V_{g3}$.

The operation of the above-mentioned vehicular power source unit will be discussed herebelow.

When the engine (not shown) starts driving, the three-phase alternator 1 starts a generation to output a three-phase alternating current voltage. The higher level diode bridge 2 applies three-phase rectified voltage to the non-engine drive associated load 8 and the battery 7 via the first power supply line $LH_1$.

The alternator output control circuit 6 turns OFF the transistor 6a by the comparator 6b when the detected voltage of the battery 7 is higher than the reference voltage, and turns ON the transistor 6a when the voltage of the battery 7 is lower than the reference voltage. By this, the current flowing through the electromagnetic coil 5 is intermittently controlled to adjust the output voltage of the alternator 1 at the constant value. In the normal case, the aforementioned reference voltage is set so that the first power source voltage of the first power supply line $LH_1$ is maintained at +12 V.

In the aforementioned operation, even when the terminal potential of the battery 7 fluctuates due to intermittently turning ON and OFF of non-engine drive associated load 8, discharge of the battery 7 and so forth, above-mentioned alternator output control circuit 6 feedback controls the terminal potential of the battery 7 at a constant level.

On the other hand, the voltage control circuit 11 detects voltage of the battery 9 and controls the switching bridge 4 ON and OFF to maintain the voltage of the battery 9 at a predetermined level. In the normal operation, the switching bridge 4 is controlled so that the second power source voltage of the second power supply line $LH_2$ can be maintained at +12 V.

Therefore, even when the voltage of the battery 9 is fluctuated by intermitting of the engine drive associated 10 or discharge of the battery 9, the voltage control circuit 11 feedback controls the terminal potential of the battery 9 at the constant level.

In the shown embodiment, the alternator 1 may be constructed to have a stator winding and a field winding, and to convert the alternating current output generated at the stator winding into direct current output. In the alternative, the alternator 1 may have a switching means which controls power supply for the field winding of the alternator to control the switching means in response to fluctuation of the terminal voltage of the first power accumulation means and whereby to adjust the output voltage of the alternator 1 for maintaining the terminal voltage of the first power accumulation means to which is supplied the power from the first output section of the rectification means.

On the other hand, in the present invention, by controlling a conduction ratio of the alternator output control means 6 and the voltage control means 11, a level difference of the terminal voltages of the first and second power accumulation means can be freely set. In such a case, it is desirable to connect one of the power accumulation means having a higher terminal voltage to the start-up system.

Although the forgoing discussion is given for example, in which the load connected in parallel to the first power accumulation means is a non-engine drive associated load, and the load connected in parallel to the second power accumulation means is the engine drive associated load, the present invention should not be specified to the shown arrangement and can be reversed.

Furthermore, in the shown embodiment, the first and second loads are respectively the engine drive associated load and the non-engine drive associated load, but the alternator output control means can control the terminal voltage of the first power accumulation means to the first predetermined voltage level, and the voltage control means control the terminal voltage of the second power accumulation means to the second predetermined voltage level which is lower than the first predetermined voltage level.

Figure 5:
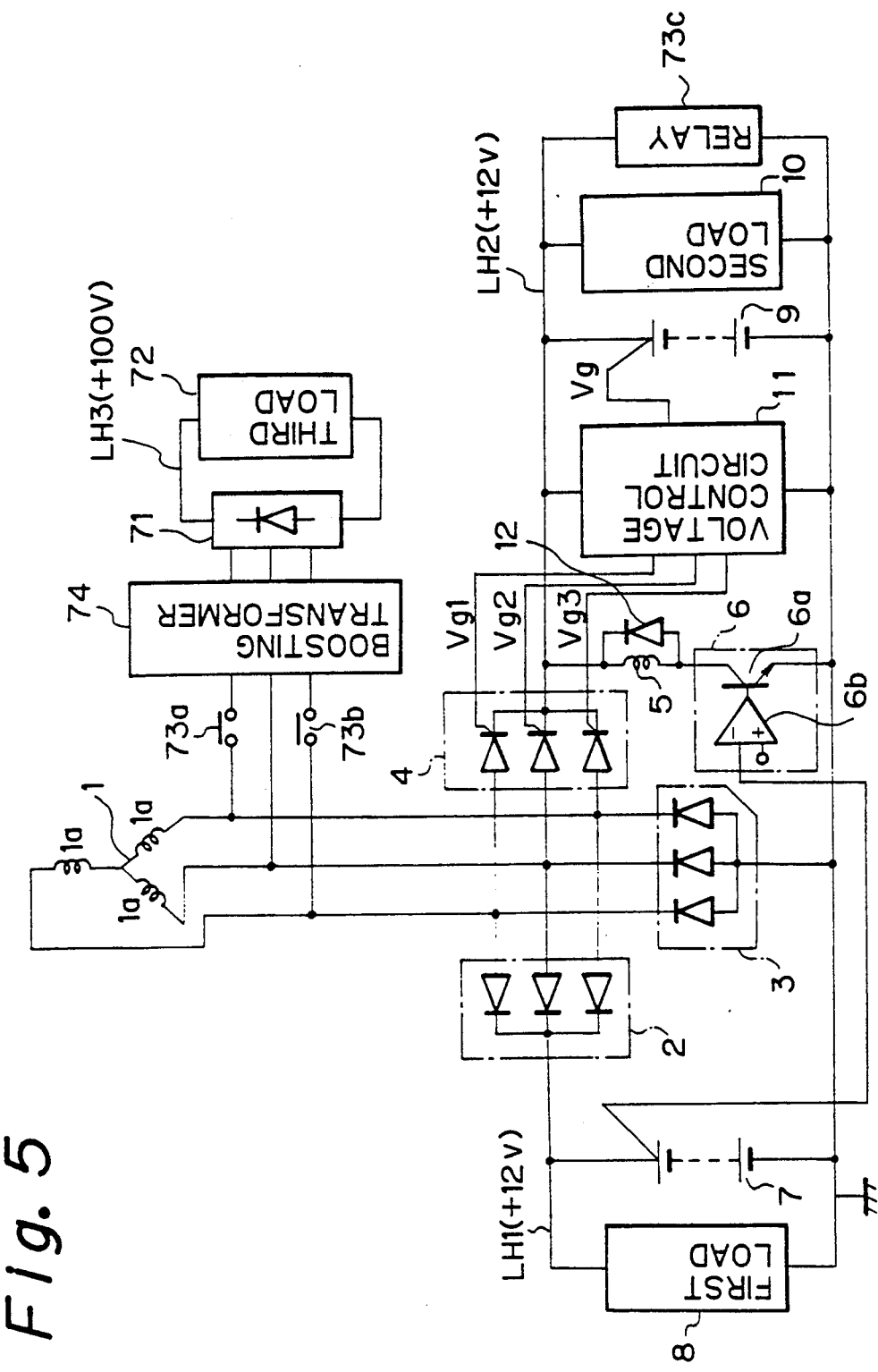
FIG. 5 is a circuit diagram of another and practical embodiment of a power source unit for an automotive vehicle, according to the invention.

Next, the second embodiment of the vehicular power source unit according to the present invention, will be discussed with reference to FIG. 5.

In the second embodiment, the construction of the vehicular power source unit has substantially the same basic construction to the first embodiment of FIG. 1. This embodiment is differentiated from the former embodiment in the presence of a third power supply line $LH_3$ for outputting a third power source voltage, in addition to the first and second power supply lines $LH_1$ and $LH_2$. For adapting to this, another rectification means 71 which is different from the rectification means 30, and a boosting transformer 74 are provided. Namely, in the shown embodiment, the three-phase alternating current voltage output from the alternator 1 is fed to the boosting transformer 74. The boosting transformer 74 boosts the alternating current voltage and rectified by the three-phase full-wave rectifier 71. A high voltage rectified by three-phase full-wave rectifier 71 is fed to the third load 72 via the third power supply line $LH_3$. The third load 72 in the shown embodiment can be a defrosting heater and other high voltage loads. In order to reduce resistance loss a boosting and three-phase full-wave rectification are performed.

In the shown embodiment, to utilize the third load 72, a relay which incorporates a relay driver circuit 73c is provided. The relay is driven to make the contacts 73a and 73b conductive. As a result, the three-phase alternating current voltage, which is boosted by the boosting transformer 74, is subject to a full-wave rectification by the full-wave rectifier 71 and then supplied to the third load 72 as the third power source voltage (+100 V).

Figure 4:
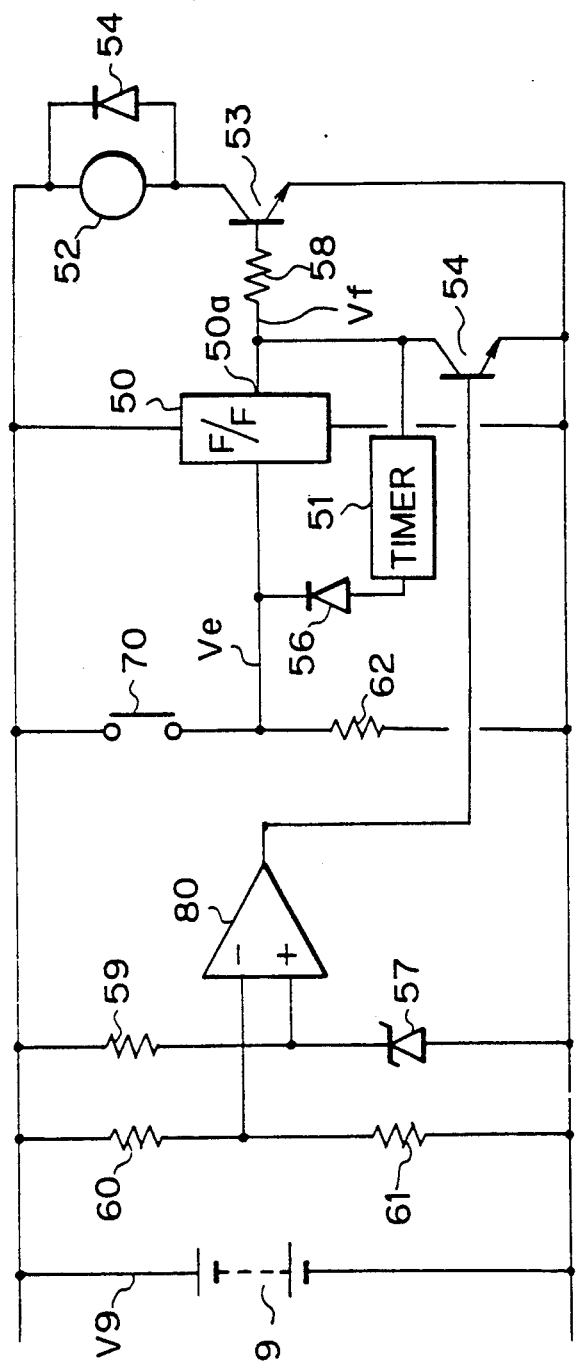
FIG. 4 is a circuit diagram of an electromagnetic coil driver circuit.

FIG. 4 shows one example of the relay circuit 73c to be employed in the shown embodiment of the power source unit according to the invention.

The reference numeral 50 denotes a known flip-flop circuit, 51 denotes a timer circuit, 52 denotes an electromagnetic coil, 53 and 54 denote transistors, 55 denotes a flywheel diode, 56 denotes a diode, 57 is a constant voltage diode, 58, 59, 60, 61 and 62 denote resistors, 70 denotes an operation switch, 80 denotes a comparator. The operation switch 70 comprises a push-ON switch which is maintained ON while depressed. To operate the operation switch 70 for operating the third load 22, the battery voltage $V_9$ is applied to the input terminal of the flip-flop 50, and the level at the output terminal 50a becomes "1". Then, the emitter grounding transistor 53 is turned ON via the resistor 58. Here, the flip-flop 50 is a type which reverses the position at the transition at which the input voltage switches from "0" to "1".

The battery voltage $V_9$ is applied to the collector of the transistor 53 via the electromagnetic coil of the relay 52. Then, the transistor 53 is turned ON. The relay 52 is then turned ON to close the contacts 73a and 73b to drive the third load 22.

To turn OFF the third load 22, the operation switch 70 is again turned ON. Also, it is possible to turn the third load 22 OFF by feeding back the output voltage Vf of the flip-flop 50 to the input terminal thereof via the timer 51 and the diode 56. By this, the output voltage Vf of the flip-flop 50 varies from "0" to "1". After a predetermined delay time, feedback voltage at the input terminal of the flip-flop 50 varies to "1" (HIGH level). At this time, when the voltage Ve at input terminal of the flip-flop 50 is "0", the output voltage Vf of the flip-flop 50 turns into "0" to open the contacts 73a and 73b of the relay. Accordingly, this timer 51 can serve as a protection device which limit power supply period for the third load 22.

Further, when the voltage $V_9$ of the battery 9 becomes lower than or equal to the predetermined voltage, the following circuit operation is performed to turn OFF the contacts 73a and 73b of the relay to give a higher priority to charging the battery 9.

Namely, a divided voltage of the voltage $V_9$ of the battery 9, which is divided by resistors 60 and 61, and a reference voltage output from a junction between the resistor 59 and the constant voltage diode 57 are compared by the comparator 80. When the voltage $V_9$ of the battery 9 is lower than the predetermined value, the output of the comparator 33 becomes "1" (HIGH level) to turn the transistor 54 ON. By the transistor 54, the output terminal of the flip-flop 50 turns into LOW level irrespective of the state of input of the flip-flop 50. In response to this, the transistor 53 turns OFF to shunt power supply for the electromagnetic coil 52 of the relay. The resistor 62 is employed for discharging the input terminal of the flip-flop 50 to low level when the operation switch 70 OFF, or when the output voltage of the timer 51 becomes LOW level. Accordingly, since the voltage of the battery 9 is detected as a condition to turn OFF the third load 22, when abnormal drop of voltage of the battery 9 for driving the engine is detected, the generated power of the alternator 1 can be supplied to the second load 10 with a higher priority.

It should be appreciated that, although the shown embodiment applies the three-phase rectified voltage to the third load, it is possible to apply the three phase alternating current voltage or single phase alternating current.

Though the foregoing embodiments employs the first load 8 and the second load 10 operable at equal voltage (+12 V), the first power source voltage can be set at higher voltage than the second power source voltage by duty controlling the switching bridge 4.

In this case, contrary to the above, the starter motor which operates well at a high voltage, may be employed as the first load 8, and electronic circuit products operate well at a low voltage, may be employed as the second load 10.

Figure 6:
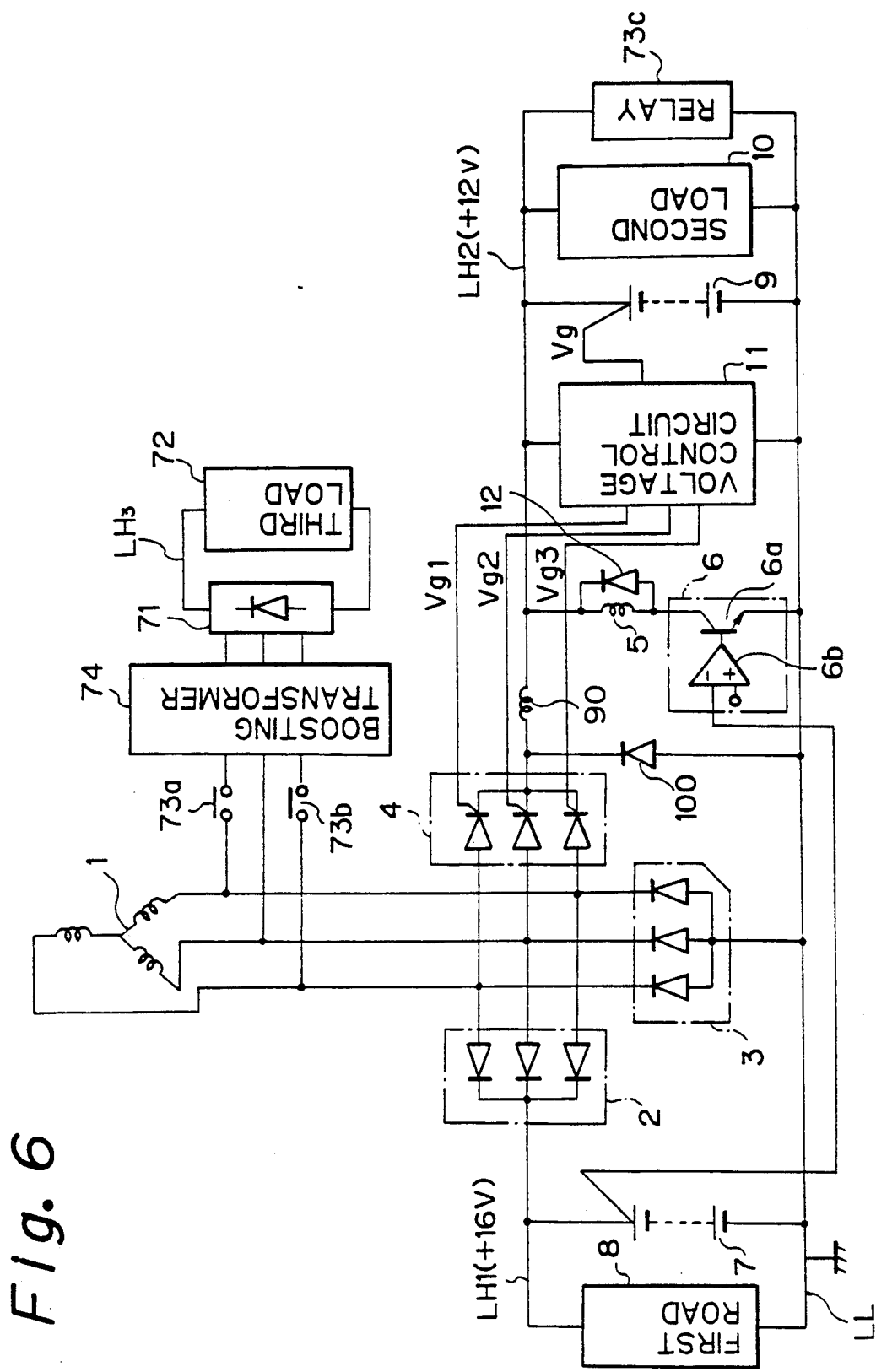
FIG. 6 is a circuit diagram of a further embodiment of a power source unit for an automotive vehicle, according to the invention.

Next, the third embodiment of the vehicular power source unit, according to the present invention, will be discussed with reference to FIG. 6. The shown embodiment is formed by modifying the foregoing first embodiment. For this, a reactor 90 is disposed between the output terminal of the switching bridge 4 and the second power supply line $LH_2$. Furthermore, the output terminal of the switching bridge 4 is connected to cathode of a diode 100. The anode of the diode 100 is grounded. In the shown embodiment, with the shown construction, the control circuit 11 is designed so that a periodic pulse signal having a predetermined period is input to respective SCRs of the switching bridge 4 for cyclically or periodically turning the latter ON and OFF. By periodically turning the SCR bridge circuit 4 ON and OFF, the switching bridge 4 outputs pulse voltage proportional to the gate trigger voltage $V_{g1}$, $V_{g2}$ and $V_{g3}$. The pulse voltages are then smoothed by the reactor 90 and the diode 100. Therefore, a voltage proportional to the duty cycle of the pulse can be applied to the battery 9.

The following is a summary of the advantages achieved by the present invention.

(a) With a single alternator, three kinds of load can be driven in parallel and independently of each other. Therefore, the vehicular electric load can be separated into a driving system (for example electric load associated with the engine, and a non-driving system for independent connections for respective power sources. With such a construction, since the electric load of the driving system is not used while the vehicle is maintained in the standstill condition, the battery cannot be exhausted except for a self-discharge. Therefore, this solves the problem of a difficulty of starting up the engine due to a weak battery.

(b) As discussed with respect to the second embodiment, since a high voltage and low voltage can be easily generated from the output voltage of the alternator, load with different rated voltage can be connected to the first power supply system (first power supply line $LH_1$) and the second power supply system (second power supply line $LH_2$).

(c) Since the power generation on the alternator is controlled based on the voltage of the battery 7 which supplies power to the first load 8 which does not drive the engine. Therefore, even when the starter motor is in actuation to cause large voltage fluctuation in the battery 9 a supply voltage for the first load 8 does not fluctuate and can be maintained stable. Therefore, such a stable power supply via the first power supply line $LH_1$ can be used for the electric equipment, such as audio set and so forth, which requires a stable power supply.

(d) Upon starting up the engine, the battery 9 can be discharged down to the allowable minimum voltage which does not cause difficulties in the driving of the engine.

(e) The third load 22 can be additionally connected in parallel to the first and second loads 8 and 10, independently of the other. Furthermore, when the voltage of the battery 9 becomes lower than a predetermined value, a power supply for the third load 22 is inhibited. The driving of the third load 22 will not cause difficulties when driving the engine.

I claim:

1. A power source unit for an automotive vehicle comprising:
   a power generator driven by an engine;
   a rectification means for converting an alternating current output of the power generator to a direct current output, and outputting the direct current output through first and second output sections;
   a first power accumulation means connected in parallel with a first load, for receiving power through the first output section;

a second power accumulation means connected in parallel with a second load, for receiving a power through the second output section;

a power generator output control means for adjusting an output of the power generator depending upon a terminal voltage of the first power accumulating means to maintain the terminal voltage of the first power accumulation means, which receives power through the first output section of the rectification means, at a first predetermined level;

said first and second power accumulation means being parallely charged respectively through said rectification means; and a voltage control means responsive to drop in a terminal voltage of the second power accumulation means to a second predetermined level, to permit power to the second power accumulation means through the second output section of the rectification means and maintain the terminal voltage of the second power accumulation means at a third predetermined level.

2. A power source unit for an automotive vehicle as set forth in claim 1, wherein said rectification means includes a lower level diode bridge having a common anode, a higher level diode bridge having a common cathode forming said first output section, a silicon controlled rectifier bridge having a common cathode forming said second output section, and said voltage control means opens and closes said silicon controlled rectifier bridge depending upon a terminal voltage of said second power accumulation means.

3. A power source unit for an automotive vehicle as set forth in claims 1 or 2, wherein said first load is irrelevant to a starting of an engine, and said second load is a load related to a starting of an engine.

4. A power source unit for an automotive vehicle comprising:

a power generator having a stator winding and a field winding and being driven by an engine;

a rectification means for converting an alternating current output generated on said stator winding to a direct current output, and outputting the direct current output through first and second output sections;

a first power accumulation means connected in parallel with a first load, for receiving power through the first output section;

a second power accumulation means connected in parallel with a second load, for receiving power through the second output section;

said first and second power accumulation means being parallely charged respectively through said rectification means;

a power generator output control means, having a first switching means for controlling a power supply for said field winding, for adjusting an output of the alternator by controlling said first switching means depending upon a terminal voltage of the first power accumulating means, to maintain the terminal voltage of the first power accumulating means, which receives power through the first output section of the rectification means, at a first predetermined level; and a voltage control means, having a second switching means responsive to a drop in a terminal voltage of the second power accumulation means to a second predetermined level, for permitting power to the second power accumulation means through the second output section of the rectification means, and maintaining the terminal voltage of the second power accumulation means at a third predetermined level.

5. A power source unit for an automotive vehicle as set forth in claim 4, wherein a conduction ratio of said first and second switching means is controlled for adjusting a level difference of terminal voltages at said first and second power accumulating means.

6. A power source unit for an automotive vehicle as set forth in claims 4 or 5, wherein one of said first and second power accumulation means having a higher terminal voltage is connected to a load associated with a system for starting an engine.

7. A power source unit for an automotive vehicle as set forth in claim 4, wherein said first and second loads are respectively a load associated with a system for starting an engine and a load irrelevant to a starting of the engine, and said third predetermined voltage level is lower than said first predetermined voltage level.

8. A power source unit for an automotive vehicle as set forth in claim 1, which further comprises a boosting transformer connected to said power generator, and a rectifier means for rectifying the alternating current voltage based on the output of said boosting transformer, said rectifier means having a third output section connected to a third load.

9. A power source unit for an automotive vehicle as set forth in claim 8, wherein said second power accumulation means includes a relay driver circuit for driving said third output section.

10. A power source unit for an automotive vehicle as set forth in claim 1, which further comprises a reactor means disposed between the second output section of said rectification means and said second power accumulation means, and a diode disposed between said second output section of said rectification means and the ground.

11. A power source unit according to claim 4, wherein said field winding is actuated by electric power supplied from said second power accumulation means related to starting of the engine.

12. A power source unit according to claim 11, wherein said field winding is connected in parallel with said second power accumulation means.

13. A power source unit according to claim 12, wherein said field winding is connected in parallel with said second power accumulation means, through a switching means serially connected to said stator winding.

14. A power source unit for an automotive vehicle as set forth in claim 1, wherein said first predetermined level equals said third predetermined level.

15. A power source unit for an automotive vehicle as set forth in claim 1, wherein said first predetermined level is greater than said third predetermined level.

16. A power source unit for an automotive vehicle as set forth in claim 1, wherein said third predetermined level is greater than said first predetermined level.

17. A power source unit for an automotive vehicle as set forth in claim 4, wherein said first predetermined equals said third predetermined level.

18. A power source unit for an automotive vehicle as set forth in claim 4, wherein said third predetermined level is greater than first predetermined level.

* * * * *